(12) United States Patent
Frink et al.

(10) Patent No.: US 7,411,910 B1
(45) Date of Patent: Aug. 12, 2008

(54) SYSTEMS AND METHODS FOR AUTOMATIC PROVISIONING OF DATA FLOWS

(75) Inventors: Craig Frink, Chelmsford, MA (US);
John B. Kenney, Littleton, MA (US);
Russell Heyda, Lexington, MA (US);
Albert E. Patnaude, Jr., Amherst, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 818 days.

(21) Appl. No.: 10/883,655

(22) Filed: Jul. 6, 2004

(51) Int. Cl.
*H04L 12/56* (2006.01)

(52) U.S. Cl. .................. 370/235; 370/395.1

(58) Field of Classification Search ............ None
See application file for complete search history.

(56) References Cited

U.S. PATENT DOCUMENTS

| | | | | |
|---|---|---|---|---|
| 6,167,452 A * | 12/2000 | Manning et al. | ............ | 370/235 |
| 6,567,408 B1 * | 5/2003 | Li et al. | ............ | 370/395.31 |
| 6,570,875 B1 * | 5/2003 | Hegde | ............ | 370/389 |
| 6,650,640 B1 * | 11/2003 | Muller et al. | ............ | 370/392 |
| 6,728,265 B1 * | 4/2004 | Yavatkar et al. | ............ | 370/468 |
| 6,810,037 B1 * | 10/2004 | Kalapathy et al. | ............ | 370/392 |
| 7,028,098 B2 * | 4/2006 | Mate et al. | ............ | 709/238 |
| 7,042,848 B2 * | 5/2006 | Santiago et al. | ............ | 370/253 |
| 7,159,030 B1 * | 1/2007 | Elzur | ............ | 370/389 |
| 7,260,518 B2 * | 8/2007 | Kerr et al. | ............ | 370/389 |
| 2002/0181463 A1 * | 12/2002 | Knight | ............ | 370/392 |
| 2002/0194362 A1 * | 12/2002 | Rawlins et al. | ............ | 370/235 |
| 2003/0084186 A1 * | 5/2003 | Yoshizawa et al. | ............ | 709/238 |
| 2005/0220022 A1 * | 10/2005 | DelRegno et al. | ............ | 370/235 |
| 2006/0218300 A1 * | 9/2006 | Yoshizawa et al. | ............ | 709/238 |
| 2007/0140128 A1 * | 6/2007 | Klinker et al. | ............ | 370/238 |

OTHER PUBLICATIONS

Redback Networks; "Subscriber Auto Provisioning with the Redback SMS Platform"; Apr. 11, 2003; 7 pages.

* cited by examiner

*Primary Examiner*—Anh-Vu H Ly
(74) *Attorney, Agent, or Firm*—Harrity Snyder, LLP (57) ABSTRACT

A system automatically provisions a data flow. The system provides a flow range. The system receives a data unit associated with an unprovisioned data flow, determines whether the unprovisioned data flow falls within the flow range, and creates an automatically provisioned data flow based on the unprovisioned data flow when the unprovisioned data flow falls within the flow range.

25 Claims, 10 Drawing Sheets

SYSTEMS AND METHODS FOR AUTOMATIC PROVISIONING OF DATA FLOWS

BACKGROUND

1. Field of the Invention

Systems and methods consistent with the principles of the invention relate generally to data transfer and, more particularly, to automatic provisioning of data flows.

2. Description of Related Art

An ATM segmentation and reassembly (SAR) unit reassembles cells into packets according to an ATM Adaptation Layer (AAL). This task involves maintaining a per packet context and associating each arriving cell with that context. The SAR does this across multiple flows and ports. Generally, each flow is configured per port prior to the SAR receiving any cells. It is possible, however, for cells to arrive at the SAR for flows that have not yet been configured. A mechanism typically either discards the cells or forwards the cells to a processor for analysis. In either event, this may lead to the dropping of potentially important packets.

SUMMARY

According to one aspect consistent with the principles of the invention, a system includes a memory and flow reassembly logic. The memory may store entries corresponding to provisioned flows in a first section and a flow range in a second section. The flow reassembly logic may identify a data unit corresponding to an unprovisioned flow that falls within the flow range, create an entry in the first section for the unprovisioned flow, reassemble a packet based on the data unit, and provide the packet for processing.

According to another aspect, a method for automatically provisioning a data flow is provided. The method may include providing a flow range, receiving a data unit associated with an unprovisioned data flow, determining whether the unprovisioned data flow falls within the flow range, and automatically provisioning the unprovisioned data flow to create an automatically provisioned data flow when the unprovisioned data flow falls within the flow range.

According to yet another aspect, a data structure embodied on a computer-readable medium is provided. The data structure may include first and second sections. The first section may include a set of entries corresponding to provisioned data flows. Each of the entries may include a key field that stores a key corresponding to the provisioned data flow and an index field that stores an index into a flow table. The second section includes a flow range corresponding to unprovisioned data flows.

According to a further aspect, a system may include a memory and flow reassembly logic. The memory may store a flow range corresponding to unprovisioned data flows. The flow reassembly logic may identify an unprovisioned data flow that falls within the flow range and automatically provision the unprovisioned data flow when the unprovisioned data flow falls within the flow range.

According to another aspect, a system for automatically provisioning unprovisioned data flows is provided. The system may include a memory and flow reassembly logic. The memory may store entries corresponding to provisioned data flows in a first section and a flow range corresponding to unprovisioned data flows in a second range. The flow reassembly logic may determine whether a received data unit is associated with a provisioned data flow with an entry in the first section or an unprovisioned data flow that falls within the flow range. When the received data unit is associated with a provisioned data flow with an entry in the first section, the flow reassembly logic may reassemble a packet based on the received data unit. When the received data unit is associated with an unprovisioned data flow that falls within the flow range, the flow reassembly logic may create a new entry in the first section to automatically provision the unprovisioned data flow and reassemble a packet based on the received data unit.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Overview

Systems and methods consistent with the principles of the invention may automatically provision unprovisioned flows. A range of flows may be programmed. When an unprovisioned flow is received that falls into a programmed range, a packet may be reassembled and sent to a processor for analysis. If the flow is validated, then the flow may, thereafter, be treated as a normally provisioned flow.

A memory may be programmed with flow ranges to distinguish between potentially desired and undesired flows as data units are received. Once a desired flow is identified, an entry may be created in the memory at an address from a list of addresses that may be supplied and managed by software. The data units for this flow may be automatically reassembled and forwarded as packets to a processor for analysis. The list of available addresses may be large enough to compensate for the latency involved in sending packets to the processor for analysis.

The rate at which packets for automatically provisioned flows are sent for analysis may be controlled to avoid overwhelming the processor. If an overrun condition occurs, the processor may lose important packets due to the resources it used to process less important packets. This circumstance may even be contrived in a Denial of Service (DOS) attack. The number packets that are sent to the processor may be controlled by managing the list of available memory addresses. This may avoid the problem associated with having more packets sent to the processor than it can handle, such as when a large number of reassembly processes complete closely in time. It may also avoid the pitfall of rate limits that might result in the discarding of important packets.

System Configuration

Figure 1:
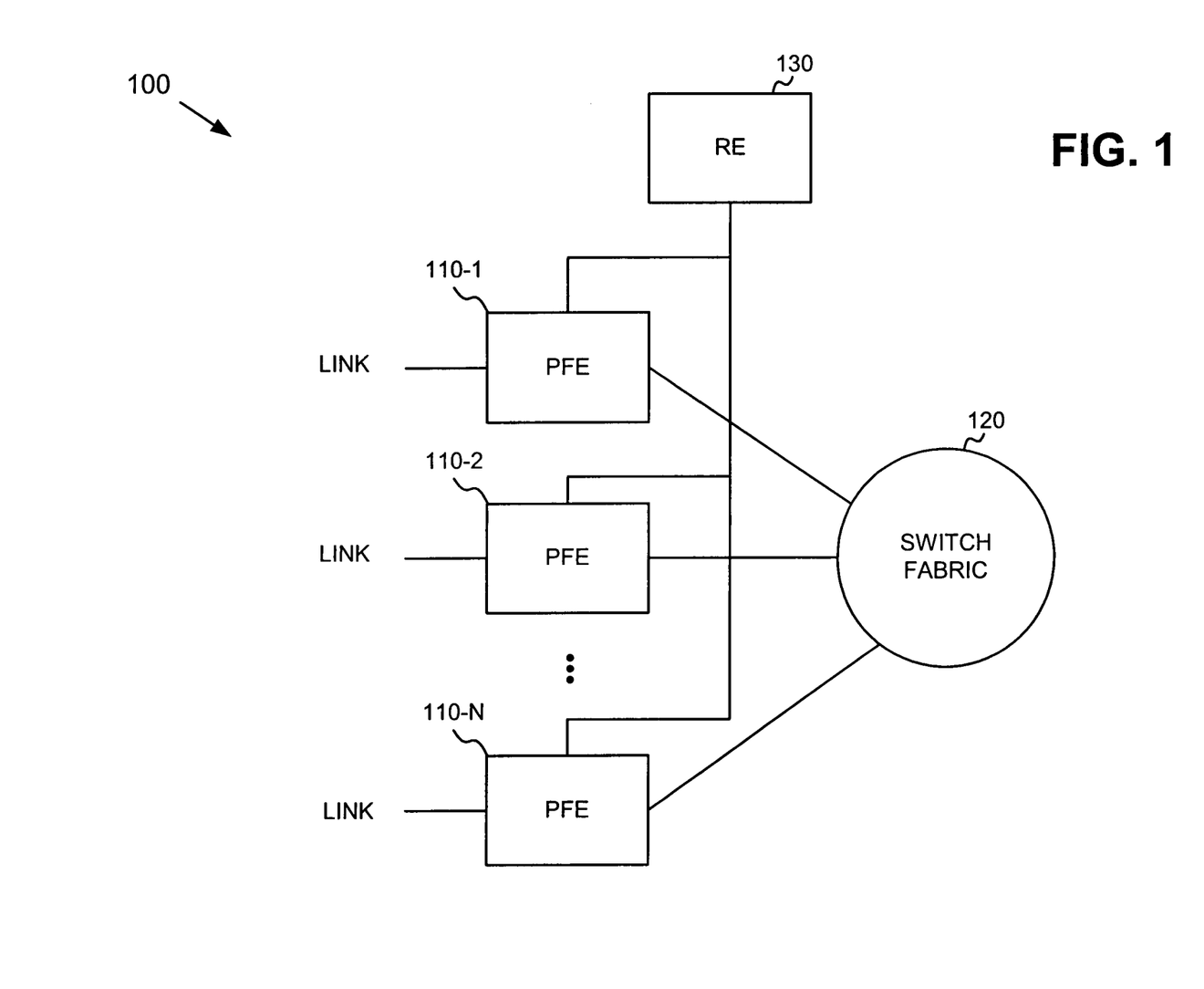
FIG. 1 is a block diagram illustrating an exemplary routing system in which systems and methods consistent with principles of the invention may be implemented.

FIG. 1 is a block diagram illustrating an exemplary routing system 100 in which systems and methods consistent with the principles of the invention may be implemented. System 100 may receive one or more packet streams from physical links, process the packet stream(s) to determine destination information, and transmit the packet stream(s) out on links in accordance with the destination information. System 100 may include packet forwarding engines (PFEs) 110-1 through 110-N (collectively referred to as packet forwarding engines 110), a switch fabric 120, and a routing engine (RE) 130.

RE 130 may perform high level management functions for system 100. For example, RE 130 may communicate with other networks and/or systems connected to system 100 to exchange information regarding network topology. RE 130 may create routing tables based on network topology information, create forwarding tables based on the routing tables, and forward the forwarding tables to PFEs 110. PFEs 110 may use the forwarding tables to perform route lookups for incoming packets. RE 130 may also perform other general control and monitoring functions for system 100.

PFEs 110 may each connect to RE 130 and switch fabric 120. PFEs 110 may receive packet data on physical links connected to a network, such as a wide area network (WAN), a local area network (LAN), or another type of network. Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet. The data may take the form of data units, where each data unit may include all or a portion of a packet.

A PFE 110-x (where PFE 110-x refers to one of PFEs 110) may process incoming data units prior to transmitting the data units to another PFE or the network. To facilitate this processing, PFE 110-x may reassemble the data units into a packet and perform a route lookup for the packet using the forwarding table from RE 130 to determine destination information. If the destination indicates that the packet should be sent out on a physical link connected to PFE 110-x, then PFE 110-x may prepare the packet for transmission by, for example, segmenting the packet into data units, adding any necessary headers, and transmitting the data units from the port associated with the physical link.

Figure 2:
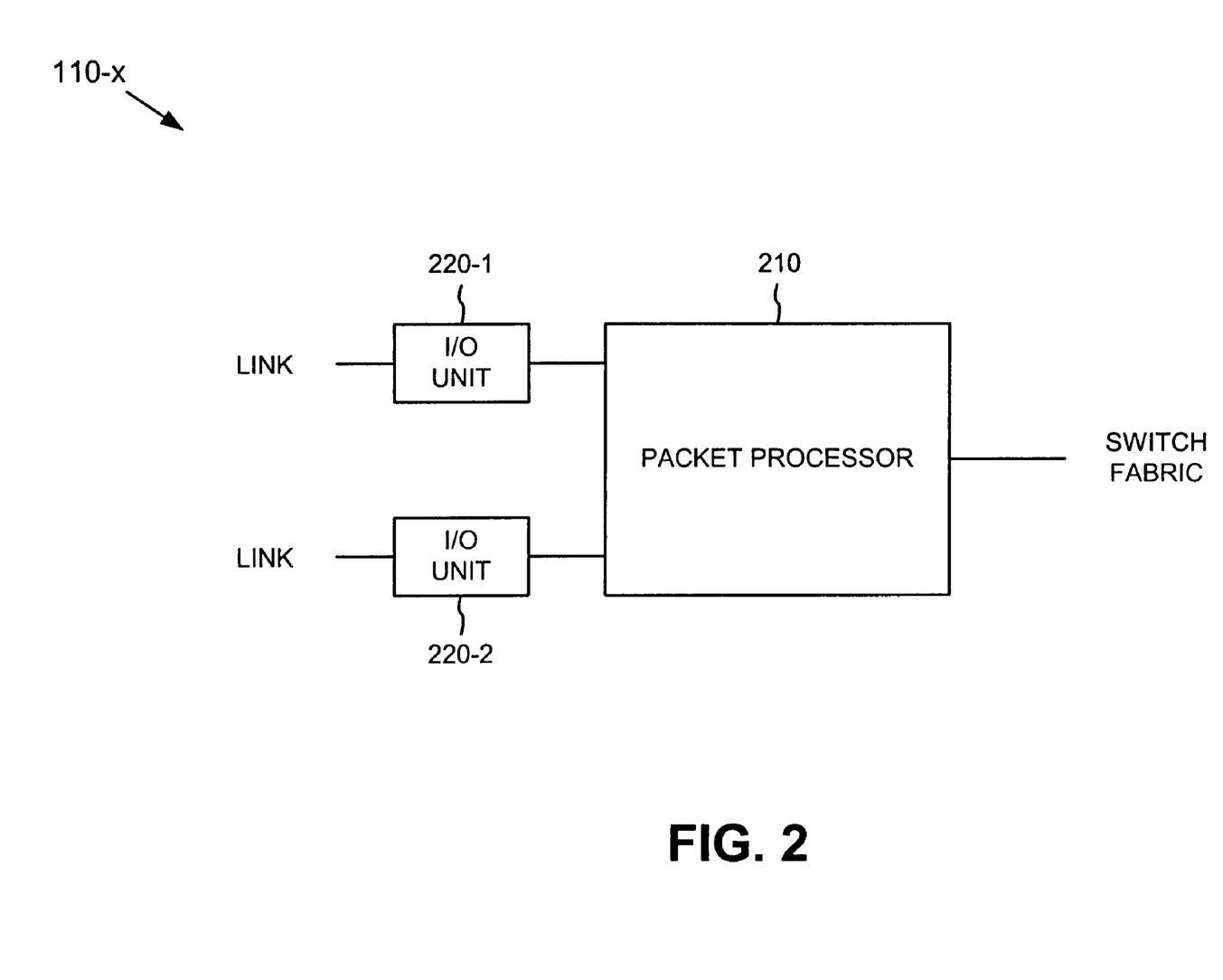
FIG. 2 is an exemplary block diagram of a portion of a packet forwarding engine of FIG. 1.

FIG. 2 is an exemplary block diagram illustrating a portion of PFE 110-x according to an implementation consistent with the principles of the invention. PFE 110-x may include a packet processor 210 and a set of input/output (I/O) units 220-1 through 220-2 (collectively referred to as I/O units 220). Although FIG. 2 shows two I/O units 220 connected to packet processor 210, in other implementations consistent with principles of the invention, there can be more or fewer I/O units 220 and/or additional packet processors 210.

Packet processor 210 may perform routing functions and handle packet transfers to and from I/O units 220 and switch fabric 120. For each packet it handles, packet processor 210 may perform the previously-discussed route lookup function and may perform other processing-related functions.

An I/O unit 220-y (where I/O unit 220-y refers to one of I/O units 220) may operate as an interface between a physical link and packet processor 210. Different I/O units may be designed to handle different types of physical links. For example, one of I/O units 220 may be an interface for an Ethernet link while another one of I/O units 220 may be an interface for an ATM link.

Figure 3:
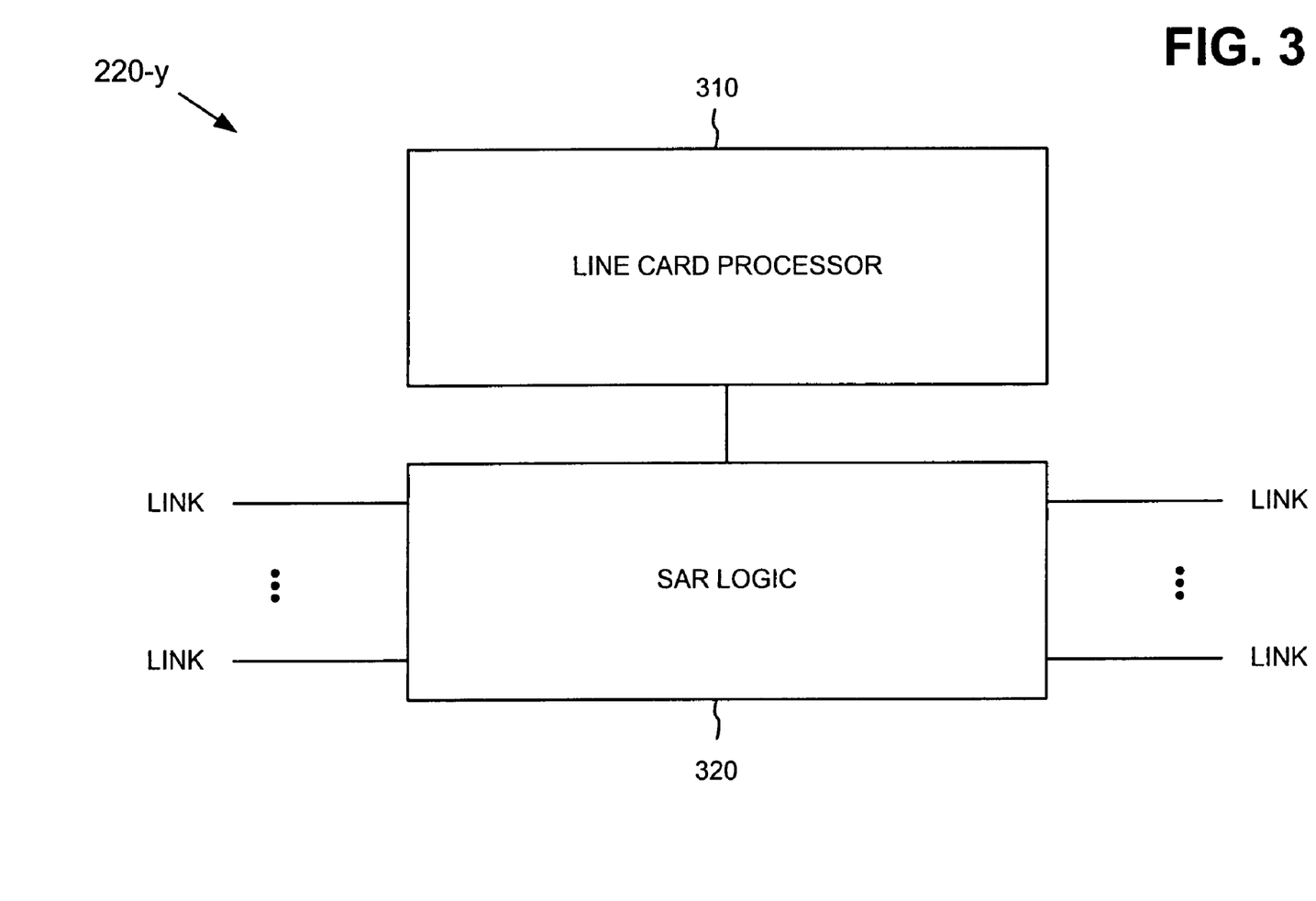
FIG. 3 is an exemplary block diagram of a portion of an input/output (I/O) unit of FIG. 2 according to an implementation consistent with the principles of the invention.

FIG. 3 is an exemplary block diagram of a portion of I/O unit 220-y according to an implementation consistent with the principles of the invention. In this particular implementation, I/O unit 220-y may operate as an interface to an ATM link. In another implementation, I/O unit 220-y may operate as another type of interface, such as a Packet over SONET (POS) interface.

I/O unit 220-y may include a line card processor 310 and segmentation and reassembly (SAR) logic 320. Line card processor 310 may process packets prior to transferring the packets to packet processor 210 or transmitting the packets on a physical link connected to SAR logic 320. SAR logic 320 may segment packets into data units for transmission on the physical links and reassemble packets from data units received on the physical links. SAR logic 320 may send reassembled packets, or raw data units, for processing by line card processor 310.

Figure 4:
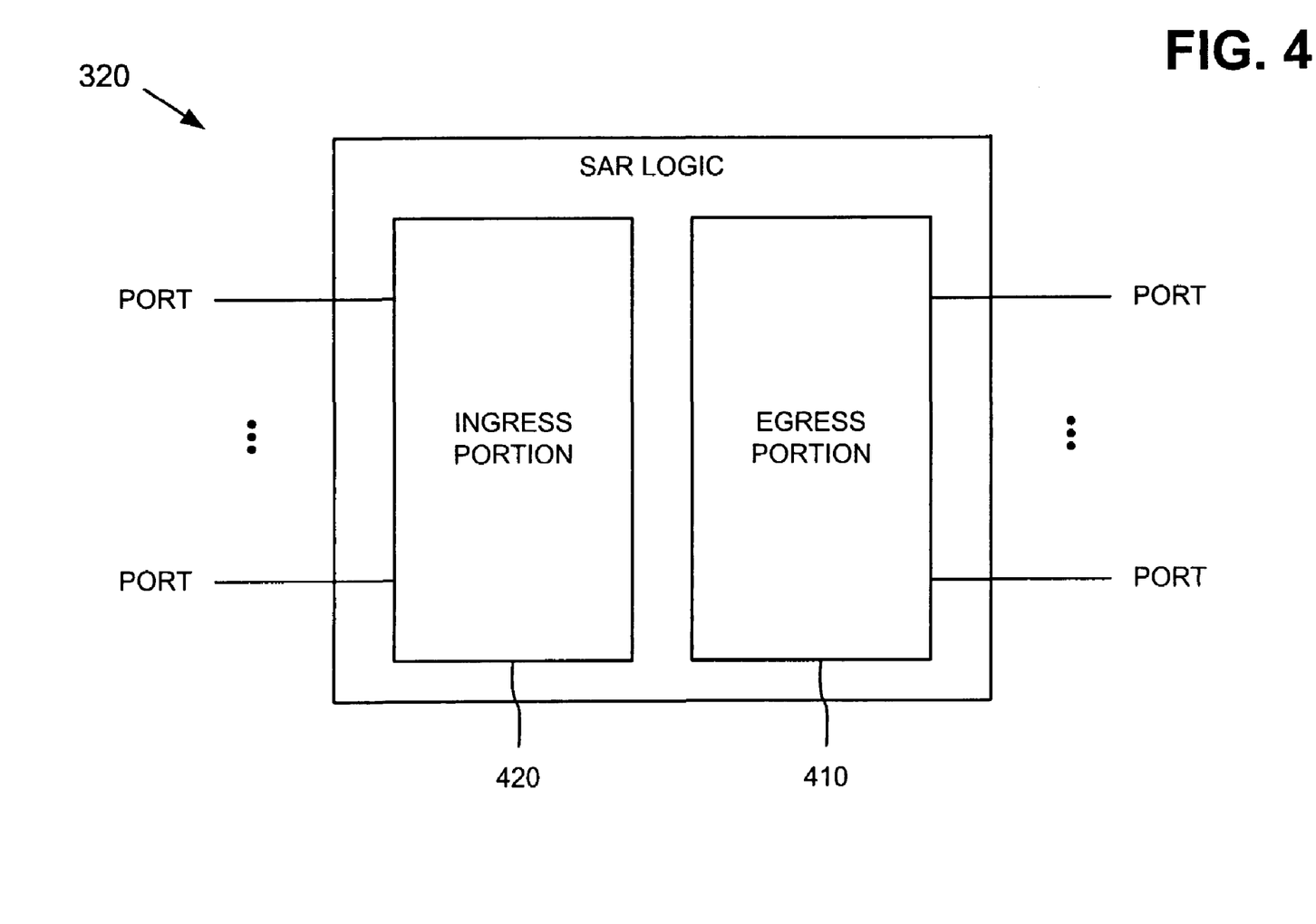
FIG. 4 is an exemplary block diagram of a portion of the segmentation and reassembly (SAR) logic of FIG. 3 according to an implementation consistent with the principles of the invention.

FIG. 4 is an exemplary diagram of a portion of SAR logic 320 according to an implementation consistent with the principles of the invention. SAR logic 320 may include an egress portion 410 and an ingress portion 420. Egress portion 410 may segment packets into data units for transmission on particular data flows. Egress portion 410 may transmit the data units via a set of associated ports.

Ingress portion 420 may receive data units on particular data flows and reassemble the data units into packets. To do this, ingress portion 420 may maintain information regarding a data flow with which a packet is associated and associate each arriving data unit of the packet with that data flow. Ingress portion 420 may process packets across multiple packet flows that are received at multiple associated input ports. Generally, each flow may be configured (provisioned) per port before ingress portion 420 receives any data units associated with that flow.

The data units associated with a particular packet may arrive at various times and possibly intertwined with data units from other flows. Each data unit may include a header and data. In one implementation, the header may include a virtual circuit identifier (VCI) that identifies a particular virtual circuit with which the data unit is associated and a virtual path identifier (VPI) that identifies a particular virtual path with which the data unit is associated.

Figure 5:
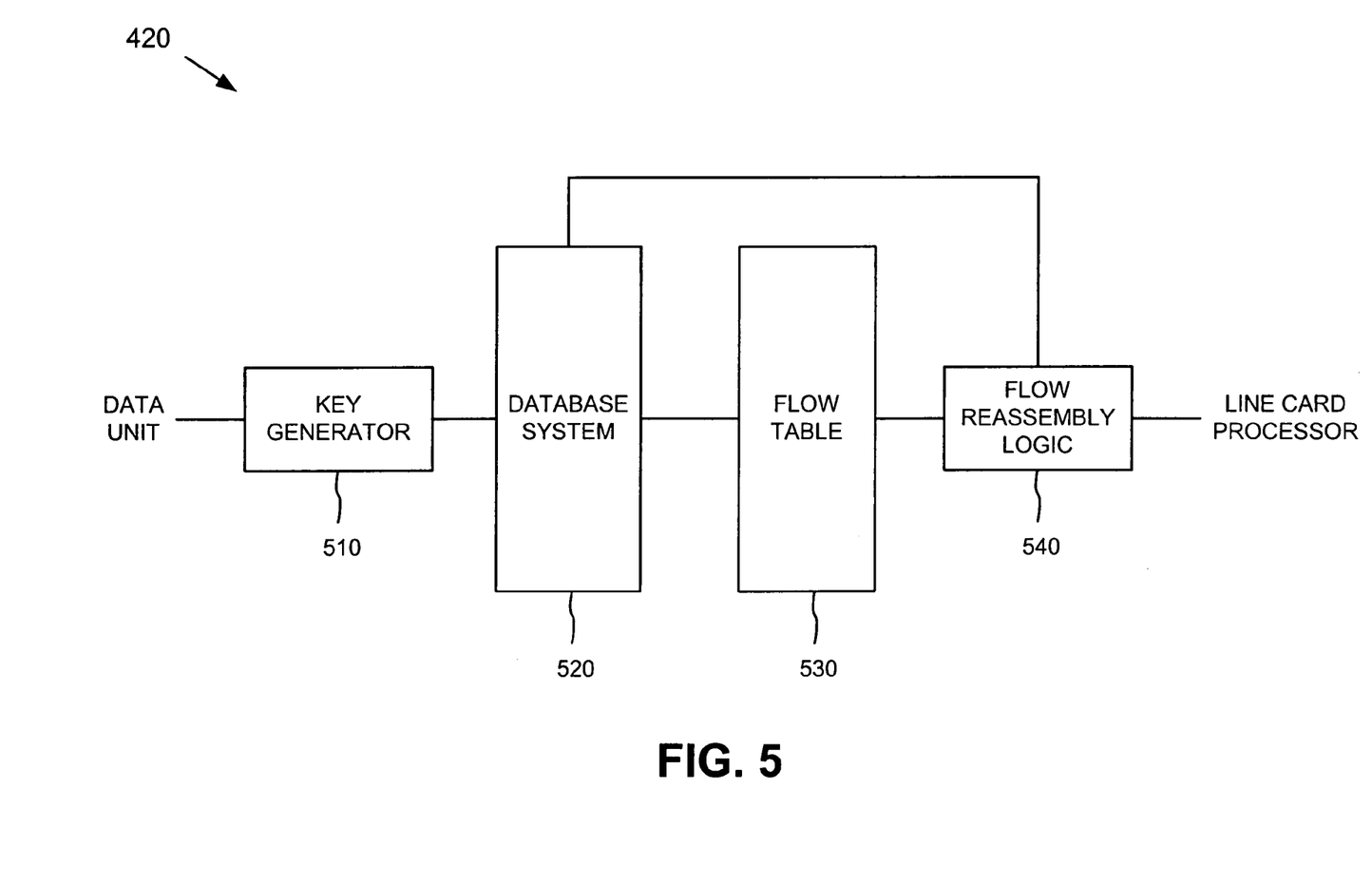
FIG. 5 is an exemplary block diagram of a portion of the ingress portion of FIG. 4 according to an implementation consistent with the principles of the invention.

FIG. 5 is an exemplary block diagram of a portion of ingress portion 420 according to an implementation consistent with the principles of the invention. Ingress portion 420 may include key generator 510, database system 520, flow table 530, and flow reassembly logic 540. Key generator 510 may process a data unit to generate a key for accessing database system 520. For example, key generator 510 may extract the data unit's VCI and VPI and use the VCI and VPI in combination with the port at which the data unit arrived to generate the key for accessing database system 520.

Database system 520 may include a number of entries that identify data units associated with provisioned and unprovisioned flows. Provisioned flows may correspond to previously configured flows, whereas, unprovisioned flows may correspond to flows that were not previously configured. For provisioned flows, database system 520 may provide an index that may be used to select an entry in flow table 530.

Flow table 530 may store attributes and commands that are associated with provisioned flows. In one implementation, an entry in flow table 530 may include a flow identifier field, a flow type field, and a flow command field associated with a particular flow. The flow identifier field may store information that identifies the flow associated with the entry. The flow type field may store a notification that may be associated with a data unit. The notification may indicate, for example, that the data unit is associated with a normally provisioned flow or an automatically provisioned flow (i.e., a flow for which an entry has been created in database system 520 by flow reassembly logic 540), or that the data unit is a raw data unit. The flow command field may include command data that instructs flow reassembly logic 540 on how to process the data unit. The command data may include, for example, a reassemble and forward command, a discard command, a flow range command, and a raw data unit command.

Flow reassembly logic 540 may process data units as instructed by the commands in flow table 530. For example, flow reassembly logic 540 may operate in response to a reassemble and forward command to reassemble a packet from received data units and forward the packet to other logic within I/O unit 220-y, such as line card processor 310 (FIG. 3). Flow reassembly logic 540 may operate in response to a discard command to discard a received data unit. Flow reassembly logic 540 may operate in response to a flow range command to create a new entry in database system 520, as will be described in more detail below. Flow reassembly logic 540 may operate in response to a raw data unit command to bypass reassembly and send a raw data unit to line card processor 310.

Exemplary Database System

Figure 6:
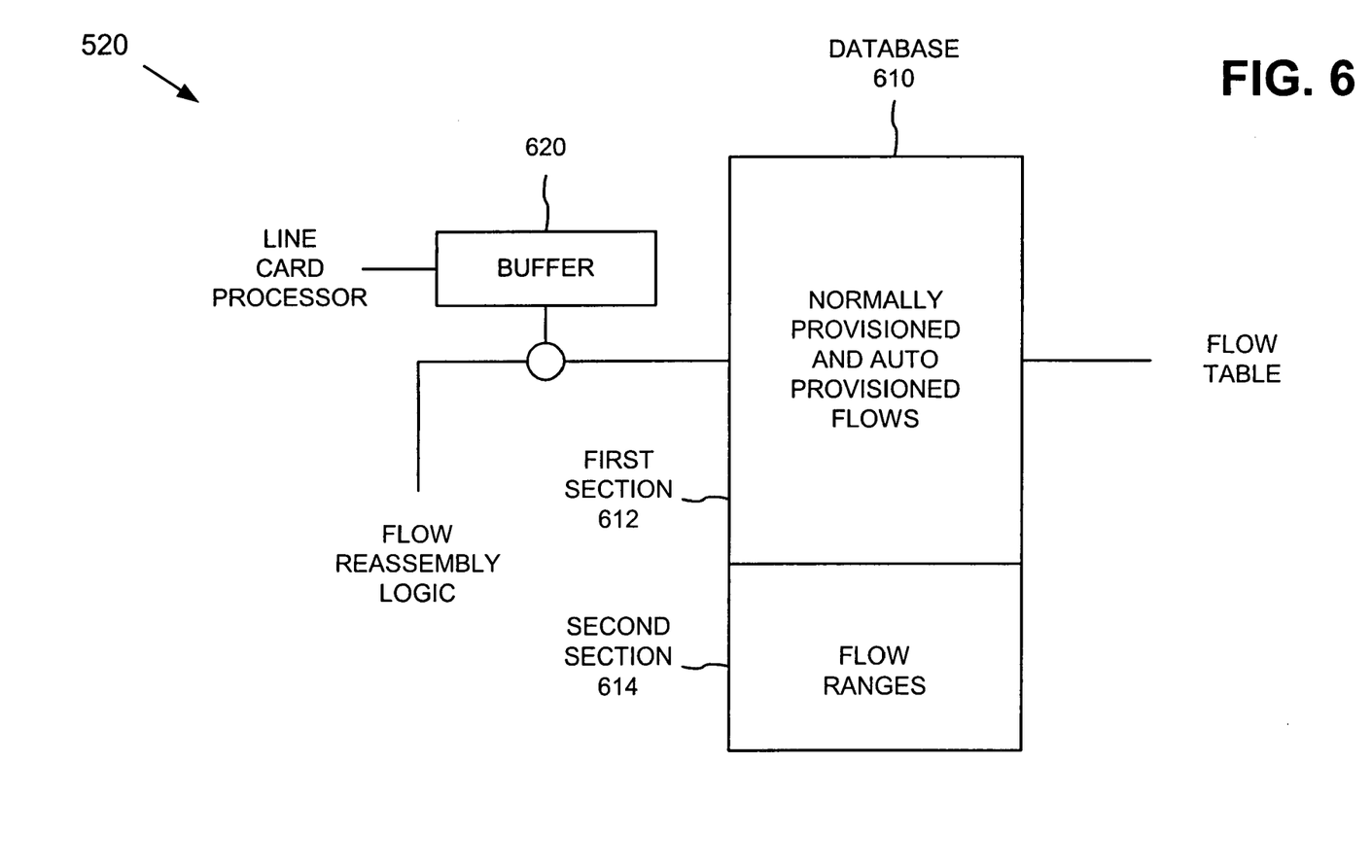
FIG. 6 is an exemplary block diagram of the database system of FIG. 5 according to an implementation consistent with the principles of the invention.

FIG. 6 is an exemplary block diagram of database system 520 according to an implementation consistent with the principles of the invention. Database system 520 may include a database 610 and a buffer 620.

Database 610 may include a logical or physical memory device that stores an array of entries that are addressable by the key generated by key generator 510 (FIG. 5). In one implementation, database 610 may take the form of a content addressable memory (CAM). In other implementations, database 610 may take other forms. Database 610 may be divided into two sections: a first section 612 that stores information corresponding to normally provisioned and automatically provisioned flows; and a second section 614 that stores information corresponding to flow ranges. In another implementation, first section 612 and second section 614 are stored in separate databases. First section 612 and second section 614 may include contiguous sections. Alternatively, first section 612 and second section 614 may include non-contiguous sections.

First section 612 may include a number of entries. An entry may store a key (i.e., a combination of a VCI, VPI, and port number) corresponding to a normally provisioned or an automatically provisioned flow and an index into flow table 530 for that flow. The key generated by key generator 510 may be used to search first section 612 for an entry storing a matching key. The index in the entry may then be used to select an entry in flow table 530.

Second section 614 may include a number of entries that store a set of ranges that may be accepted by ingress portion 420. An entry may store a flow range and an index into flow table 530. The flow range may specify a range of VCIs and/or VPIs for a given port number. The set of ranges in second section 614 may be "virtually" established in that they appear to be setup when they are not fully configured. In one implementation, the set of ranges may be user-configurable. The set of ranges may be used to facilitate bulk configuration setup. The index in the entry may then be used to select an entry in flow table 530.

Database 610 may output a match flag in response to a key search. The match flag may indicate whether the key search resulted in a hit or a miss in an entry of first section 612 or within one of the ranges in second section 614.

Buffer 620 may store a list of available database addresses in first section 612 that flow reassembly logic 540 (FIG. 5) may use to store new entries. In one implementation, buffer 620 is configured as a first-in, first-out (FIFO) memory. The list of available addresses within first section 612 may be managed by software, such as software executing on line card processor 310. Via buffer 620, the software may control the number of unprovisioned flows that are automatically provisioned by flow reassembly logic 540. When buffer 620 is empty, automatic provisioning of flows is disabled.

Exemplary Processing

Figure 7:
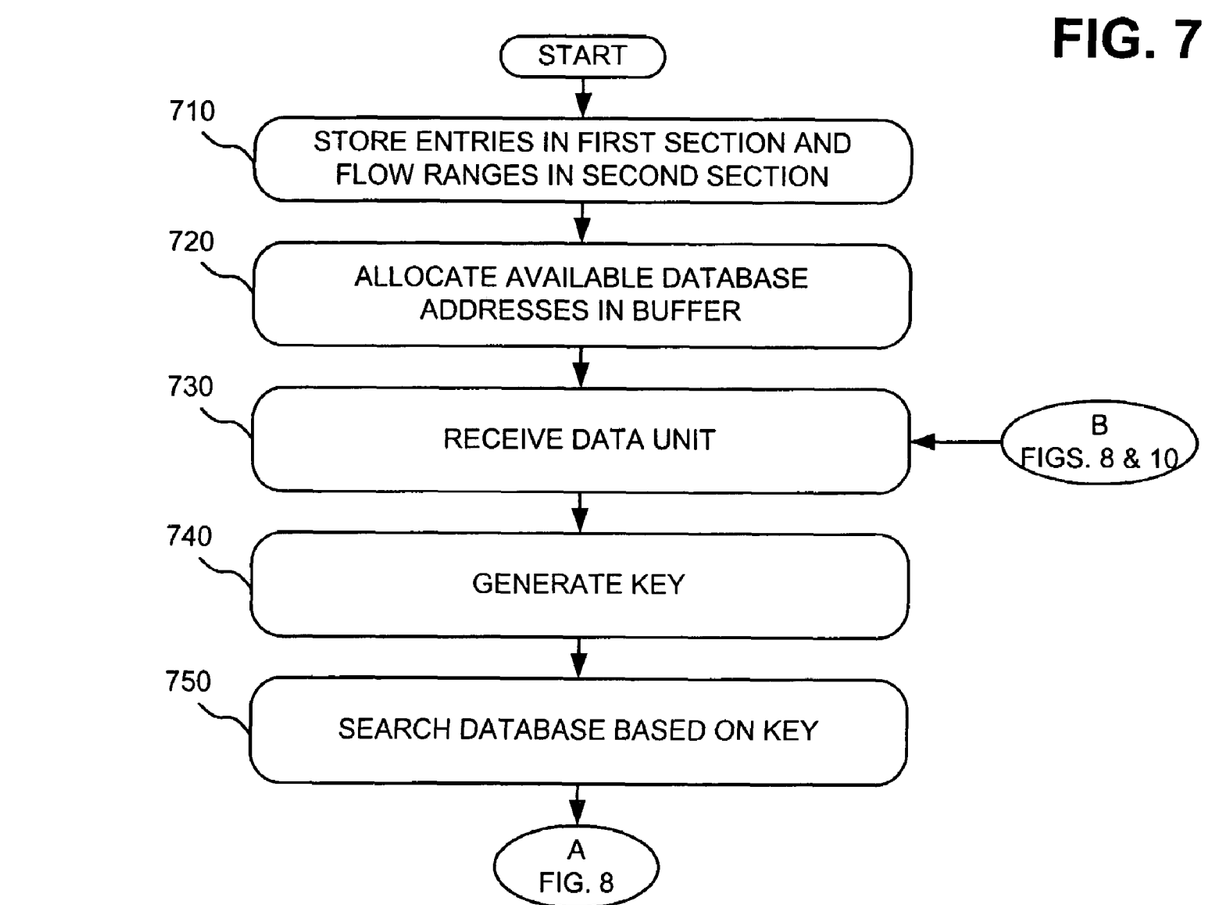
FIGS. 7-10 are flowcharts of exemplary processing for data units according to an implementation consistent with the principles of the invention.

FIGS. 7-10 are flowcharts of exemplary processing for data units according to an implementation consistent with the principles of the invention. Processing may begin with the storing of entries in first section 612 and flow ranges in second section 614 of database 610 (act 710) (FIG. 7). The data flows in first section 612 may be created and provisioned and the set of ranges stored in second section 614 may be controlled and managed by software, such as software operating on line card processor 310.

A list of available addresses in database 610 may be stored in buffer 620. Software, such as software operating on line card processor 310, may manage the list of available addresses, which may be a subset of the set of addresses available in database 610. In other words, the software may determine the number of addresses in database 610 that it will permit flow reassembly logic 540 to use for automatically provisioning flows. The software may limit the number of addresses stored in buffer 620 so as not to overwhelm line card processor 310 when a large number of flows to be automatically provisioned arrive in succession, such as when a large number of users successively try to use flows in the flow ranges. The number of addresses stored in buffer 620 may be automatically or manually adjusted.

A data unit may be received by ingress portion 420 of SAR logic 320 (act 730). A key may then be generated based on the data unit (act 740). For example, key generator 510 may extract the VCI and VPI from the header of the data unit and combine the VCI and VPI with the port number of the port at which the data unit was received to form the search key.

The search key may be used to search database 610 (act 750). For example, first section 612 of database 610 may be searched to determine whether any of the entries include a key that matches the search key. Second section 614 may also be searched to determine whether the search key falls within one of the stored flow ranges.

If the search key matches (hits) an entry in first section 612 (act 810) (FIG. 8), then database 610 may output a flow table index and a match flag (act 820). The match flag, in this case, may indicate that a hit occurred in database 610. The index may be used to access an entry in flow table 530 to identify flow attributes and a command associated with the received data unit (act 830).

Figure 8:
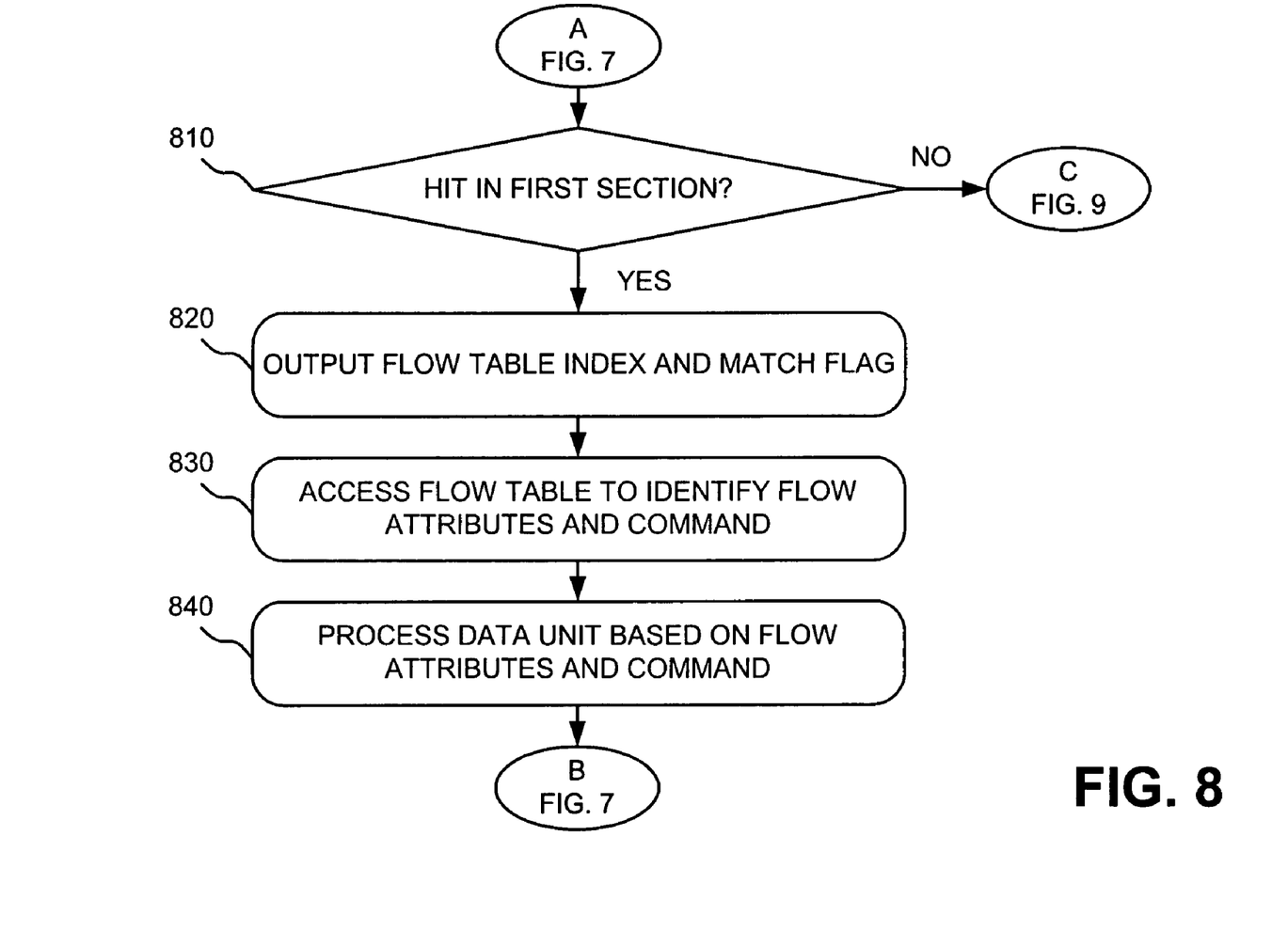

As described above, the flow attributes may identify a flow identifier that specifies the flow with which the received data unit is associated. The flow attributes may also identify a flow type, such as a notification, that indicates that the received data unit is associated with a normally provisioned flow or an automatically provisioned flow, or that the received data unit is a raw data unit. If the search key matches an entry in first section 612, the flow type might identify the data unit as being associated with a normally provisioned flow. The flow command may include a reassemble and forward command, a discard command, a flow range command, or a raw data unit command. If the search key matches an entry in first section 612, the flow command might identify the reassemble and forward command, the discard command, or the raw data unit command.

The received data unit may then be processed based on the flow attributes and the flow command (act 840). For example, if the flow command includes the reassemble and forward command, flow reassembly logic 540 may collect data units associated with the same flow as the received data unit, reassemble the packet from the collected data units, and forward the packet to line card processor 310. In this case, flow reassembly logic 540 may send a notification with the packet that indicates that the packet is associated with a normally provisioned flow.

If the flow command includes the discard command, flow reassembly logic 540 may discard the received data unit. If the flow command includes the raw data unit command, flow reassembly logic 540 may forward the received data unit to line card processor 310 without reassembling the packet. In this case, flow reassembly logic 540 may send a notification with the data unit that indicates that the data unit is a raw data unit. Line card processor 310 may reassemble a packet from the data unit and possibly other data units associated with the same flow to determine how to process the data unit and, thus, the packet.

If the search key does not match an entry in first section 612 (act 810) (FIG. 8) or second section 614 (act 910) (FIG. 9), then the received data unit may be subjected to preprogrammed processing (act 920). For example, the received data unit might be discarded. Alternatively, the received data unit might be forwarded to line card processor 310. Line card processor 310 may then analyze the data unit to determine how to process it.

Figure 9:
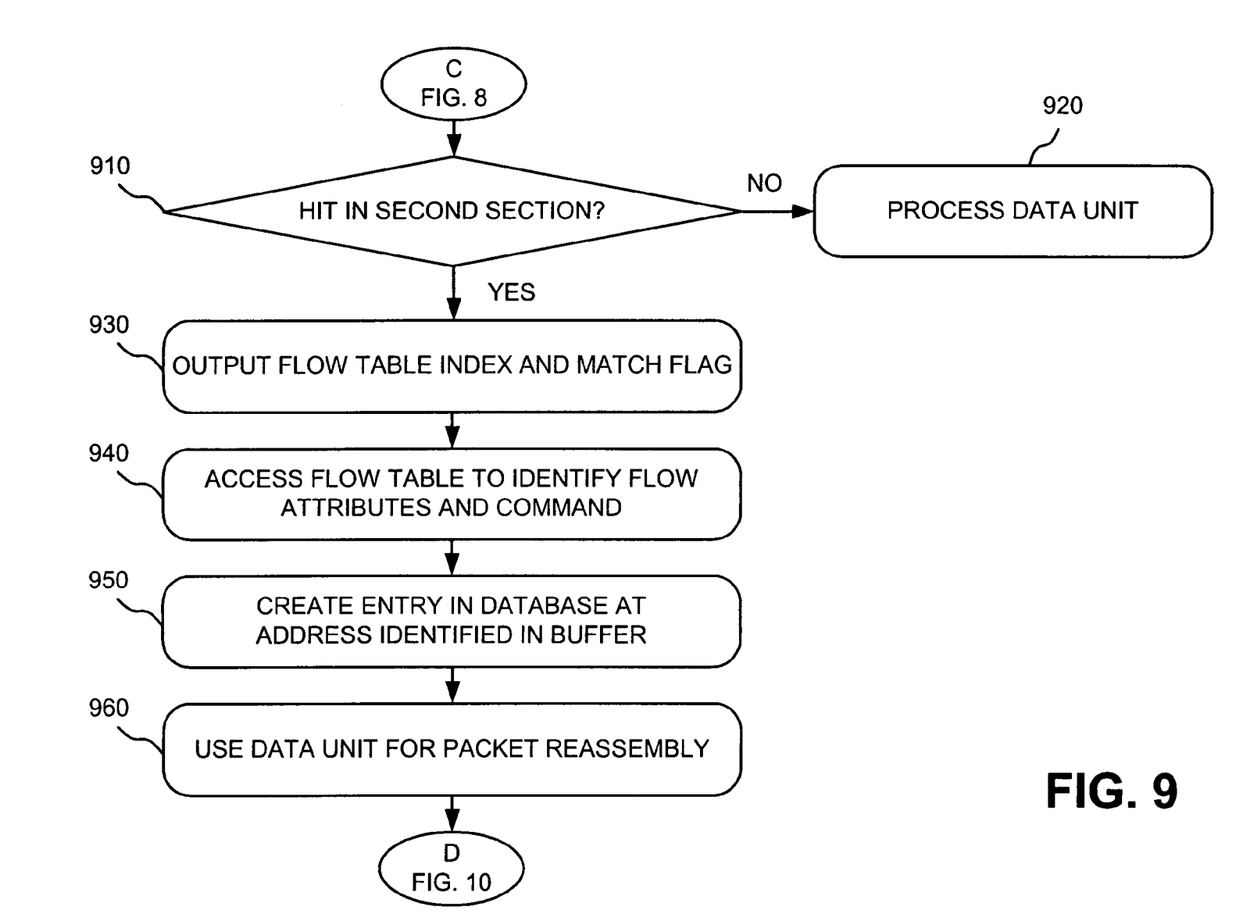

If the search key matches (hits) an entry in second section 614 (act 910), then database 610 may output a flow table index and a match flag (act 930). The match flag, in this case, may indicate that a hit occurred in database 610. The index may be used to access an entry in flow table 530 to identify flow attributes and a command associated with the received data unit (act 940).

As described above, the flow attributes may identify a flow identifier that specifies the flow with which the received data unit is associated. The flow attributes may also identify a flow type, such as a notification, that indicates that the received data unit is associated with a normally provisioned flow or an automatically provisioned flow, or that the received data unit is a raw data unit. If the search key matches an entry in second section 614, the flow type might identify the data unit as being associated with an automatically provisioned flow. The flow command may include a reassemble and forward command, a discard command, a flow range command, or a raw data unit command. If the search key matches an entry in second section 614, the flow command might identify the flow range command.

The received data unit may then be processed based on the flow attributes and the flow command. Because the flow command includes the flow range command, flow reassembly logic 540 may create an entry in database 610 at an address identified in buffer 620 (act 950). For example, flow reassembly logic 540 may access buffer 620 to determine whether buffer 620 stores an address in database 610. If buffer 620 does not store any database addresses, then flow reassembly logic 540 may not create an entry in database 610 and may perform some predetermined act, such as discarding the data unit or forwarding the data unit to line card processor 310. If buffer 620 stores a database address, however, flow reassembly logic 540 may create an entry in database 610 at the address from buffer 620. The entry may include a key (e.g., a combination of a VCI, VPI, and port number) corresponding to this automatically provisioned flow and an index into flow table 530 for that flow.

The received data unit may then be used to reassemble a packet (act 960). For example, flow reassembly logic 540 may collect data units associated with the same flow as the received data unit, reassemble the packet from the collected data units, and forward the packet to line card processor 310. In this case, flow reassembly logic 540 may send a notification with the packet that indicates that the packet is associated with an automatically provisioned flow.

Figure 10:
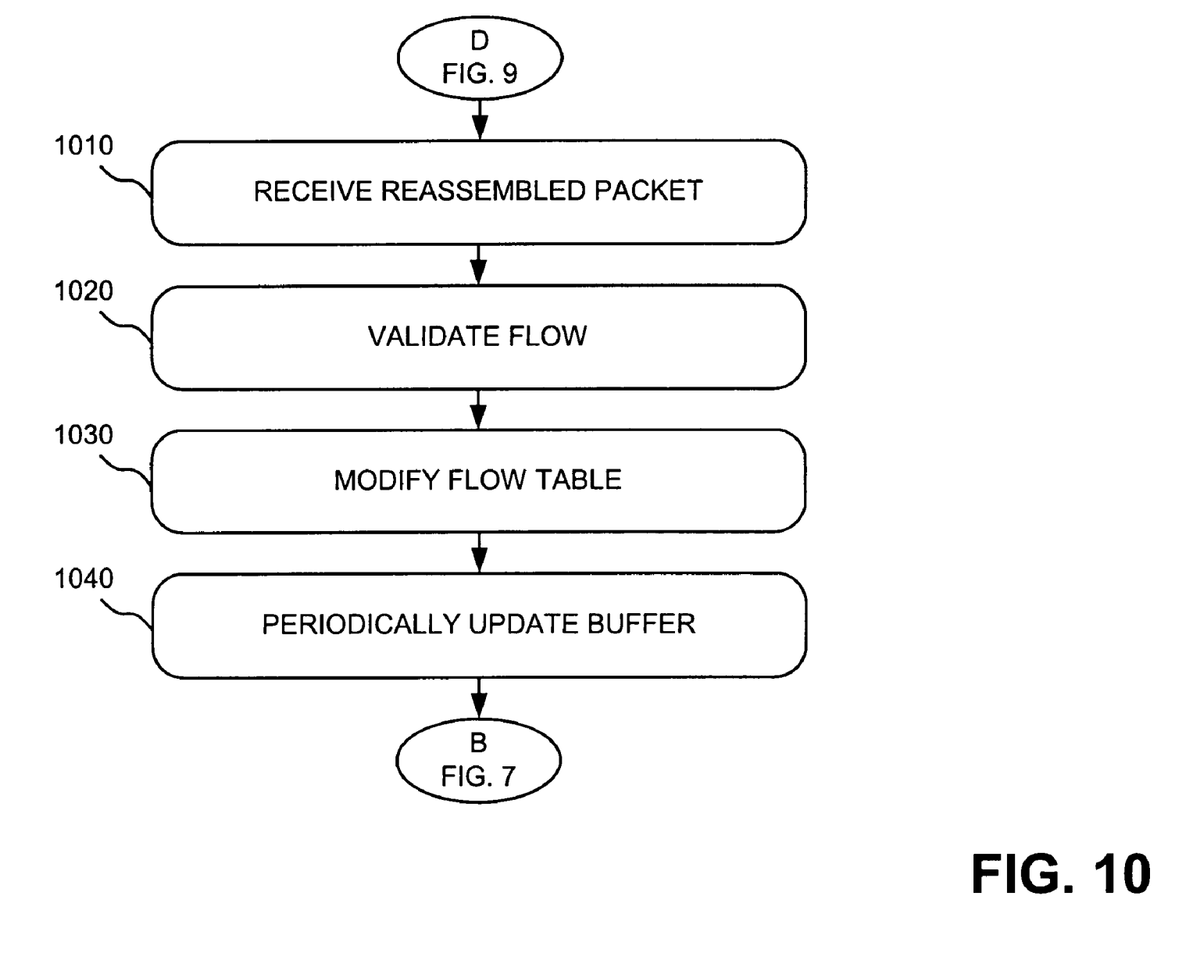

The reassembled packet may be received by line card processor 310 (act 1010) (FIG. 10). The packet may be analyzed to validate the automatically provisioned flow (act 1020). For example, line card processor 310 may perform a flow look-up to determine whether the flow is in a permitted range.

Flow table 530 may be modified based on a result of the determination by line card processor 310 (act 1030). If line card processor 310 determines that the flow is in a permitted range, then line card processor 310 may modify flow table 530 to identify the flow as a normally provisioned flow. For example, line card processor 310 may modify flow table 530 to include a flow type corresponding to a normally provisioned flow and a flow command corresponding to a reassemble and forward command. If line card processor 310 determines that the flow is not in a permitted range, then line card processor 310 may modify flow table 530 to identify the flow for discard. For example, line card processor 310 may modify flow table 530 to include a flow command corresponding to a discard command. This can be used to filter out attempts to connect through system 100 that are not expected or desired.

The number of available addresses in buffer 620 may be periodically updated (act 1040). For example, line card processor 310 may manage the number of database addresses available in buffer 620. If buffering used by line card processor 310 to handle notifications regarding automatically provisioned flows is small (or becomes small), then line card processor 310 may make few database addresses available in buffer 620. By controlling the number of database addresses in buffer 620, line card processor 310 may control the number of notifications regarding automatically provisioned flows that it receives.

It is expected that the first packet in an automatically provisioned flow will not be followed by another packet until the initiator receives an acknowledgement or several seconds have expired. Because of this fact, it is not anticipated that the packet rate of a single flow will inundate line card processor 310 with a large number of high speed packets. It is possible that a large number of flows to be automatically provisioned will arrive at ingress portion 420 quickly in succession as a large number of users try to use the bulk configured flows. The number of these automatically provisioned flows is limited, however, by the number of database addresses installed in buffer 620. Once buffer 620 becomes empty, automatic provisioning is disabled until line card processor 310 replenishes buffer 620 with a new batch of database addresses. This provides some self-inflicted rate limiting.

If a large number of flow ranges is defined, it may be helpful to reduce the maximum receive unit (MRU) to a size less than a maximum of 9200 bytes. In this way, streams of data with no end of packet (EOP) or associated with automatically provisioned flows will not monopolize memory. This will help manage memory for automatically provisioned flows. For example, the MRU may be used to limit the size of packets that are reassembled, thereby using less memory space and reducing the amount of information sent to line card processor 310 to validate. If there are only a few small flow ranges, this MRU reduction may not be necessary since maximum sized packets will not consume significant memory space. If desirable, line card processor 310 may increase a flow's MRU when it validates the flow and updates flow table 530.

CONCLUSION

Systems and methods consistent with the principles of the invention may automatically provision some unprovisioned data flows. For example, the systems and methods may identify unprovisioned flows that fall within a programmed flow range and reassemble the data units associated with these flows into packets. The flow ranges may be programmed in a database so that when a flow matches one of these ranges, the associated flow table can indicate what actions to take, such as reassembling the packet and sending a notification to the line card processor that the flow is an automatically provisioned flow. As such, the systems and methods may permit a transition from an automatically provisioned flow to a provisioned flow with no loss of traffic.

Automatic provisioning of flows may be used to facilitate bulk configuration setup by an end customer. A range of flows may be "virtually" established, in that it appears that they are setup when in fact they are not fully configured. The first packet received on one of these flows is usually some kind of "connect" request that waits for a response. It is expected that this first packet makes it through the automatic provisioning process without being dropped and reaches its destination (e.g., the line card processor) which returns an acknowledgement after it has established the appropriate interface.

When a range of flows is defined and enabled, entries for automatically provisioned flows may automatically be created in the database. Thereafter, these flows may be handled as normally provisioned flows. An automatically provisioned flow may be handled in the exception path of the flow reassembly logic and sent to the line card processor for processing. The line card processor, after it has determined that the connection is valid, may update the database so that later data units can be handled and forwarded normally (as a normally provisioned flow) by the flow reassembly logic.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, although described in the context of a routing system, concepts consistent with the principles of the invention can be implemented in any system, device, or chip that communicates with another system, device, or chip via one or more buses.

Also, while series of acts have been described with regard to FIGS. 7-10, the order of the acts may differ in other implementations consistent with the principles of the invention. Also, non-dependent acts may be performed in parallel.

In addition, systems and methods have been described as processing packets. In alternate implementations, systems and methods consistent with the principles of the invention may process other, non-packet, data.

Further, certain portions of the invention have been described as "logic" that performs one or more functions. This logic may include hardware, such as an application specific integrated circuit, software, or a combination of hardware and software.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system, comprising:
   a memory to store entries corresponding to provisioned flows in a first section and a flow range corresponding to unprovisioned flows in a second section; and
   flow reassembly logic to:
   identify a data unit corresponding to an unprovisioned flow falls within the flow range,
   create an entry in the first section for the unprovisioned flow,
   reassemble a packet based on the data unit, and
   provide the packet for processing.

2. The system of claim 1, further comprising:
   a key generator to:
   receive the data unit, and
   generate a search key based on the data unit; and
   wherein the memory is configured to be searched to determine whether the search key matches data in the first section or the second section.

3. The system of claim 1, further comprising:
   a buffer to store a list of addresses of available storage locations in the first section of the memory.

4. The system of claim 3, wherein a size of the list of addresses is software controlled.

5. The system of claim 3, wherein a size of the list of addresses controls the number of entries that can be created in the first section of the memory for unprovisioned flows.

6. The system of claim 3, wherein the list of addresses includes less than all of the available storage locations in the first section of the memory.

7. The system of claim 3, wherein when creating an entry in the first section, the flow reassembly logic is configured to:

access the buffer to obtain an address of an available one of the storage locations in the first section, and create an entry in the available storage location for the unprovisioned flow.

8. The system of claim 3, wherein the flow reassembly logic is configured to:

access the buffer to determine whether an address of an available one of the storage locations in the first section exists, and discard the data unit when an address of an available one of the storage locations in the first section does not exist.

9. The system of claim 1, wherein when reassembling a packet, the flow reassembly logic is configured to:

receive multiple data units corresponding to the unprovisioned flow, and reassemble the packet from the multiple data units.

10. The system of claim 1, wherein when providing the packet for processing, the flow reassembly logic is configured to include a notification that identifies the unprovisioned flow as an automatically provisioned flow.

11. The system of claim 1, further comprising:

a processor to:

receive the packet, and validate the unprovisioned flow to identify whether the unprovisioned flow is permitted.

12. A system for automatically provisioning a data flow, comprising:

means for storing entries corresponding to provisioned data flows in a first section of a memory and a flow range corresponding to unprovisioned data flows in a second section of the memory;

means for receiving a data unit associated with an unprovisioned data flow that falls within the flow range;

means for creating an automatically provisioned data flow based on the unprovisioned data flow and creating an entry in the first section;

means for reassembling a packet based on the data unit; and means for providing the packet for processing.

13. A method for automatically provisioning a data flow, comprising:

providing a flow range corresponding to unprovisioned data flows;

providing a number of entries corresponding to provisioned data flows;

providing a list of addresses of storage locations available for creating new entries;

receiving a data unit associated with an unprovisioned data flow;

determining whether the unprovisioned data flow falls within the flow range;

determining whether the list of addresses is empty when the unprovisioned data flow falls within the flow range;

dropping the data unit when the list of addresses is empty; and automatically provisioning the unprovisioned data flow to create an automatically provisioned data flow when the unprovisioned data flow falls within the flow range and the list of addresses is not empty.

14. The method of claim 13, wherein automatically provisioning the unprovisioned data flow comprises:

creating a new entry corresponding to the automatically provisioned data flow.

15. The method of claim 13, wherein a size of the list of addresses is software controlled.

16. The method of claim 13, wherein a size of the list of addresses controls the number of new entries that can be created for provisioned data flows.

17. The method of claim 13, wherein the list of addresses includes less than all of the possible storage locations available for storing new entries.

18. The method of claim 13, further comprising:

reassembling a packet based on the data unit when the unprovisioned data flow falls within the flow range.

19. The method of claim 18, wherein reassembling a packet comprises:

receiving multiple data units corresponding to the unprovisioned data flow, and reassembling the packet from the multiple data units.

20. The method of claim 18, further comprising:

providing the packet with a notification that identifies the packet as being associated with an automatically provisioned flow for processing.

21. The method of claim 13, further comprising:

validating the automatically provisioned data flow to identify whether the automatically provisioned data flow is permitted.

22. A computer-readable medium embodied with a data structure, comprising:

a first section comprising a plurality of entries corresponding to provisioned data flows, each of the entries comprising:

a key field to store a key corresponding to a provisioned data flow, and an index field to store an index into a flow table; and a second section comprising a flow range corresponding to unprovisioned data flows.

23. The computer-readable medium of claim 22, wherein the key comprises a combination of a virtual circuit identifier and a virtual path identifier.

24. The computer-readable medium of claim 22, wherein the flow range comprises a range of at least one of virtual circuit identifiers or virtual path identifiers.

25. A system for automatically provisioning unprovisioned data flows, comprising:

a memory to store entries corresponding to provisioned data flows in a first section and a flow range corresponding to unprovisioned data flows in a second section; and flow reassembly logic to:

determine whether a received data unit is associated with a provisioned data flow with an entry in the first section or an unprovisioned data flow that falls within the flow range, when the received data unit is associated with a provisioned data flow with an entry in the first section, reassemble a packet based on the received data unit, and when the received data unit is associated with an unprovisioned data flow that falls within the flow range, create a new entry in the first section to automatically provision the unprovisioned data flow, and reassemble a packet based on the received data unit.

* * * * *